Figure 1:
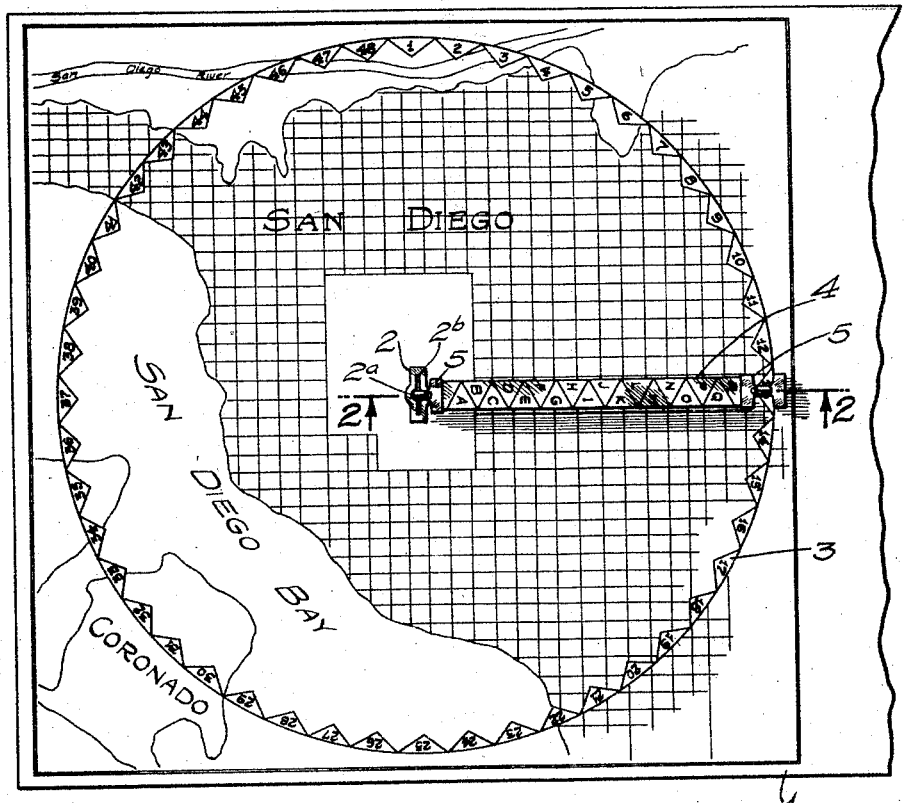

June 16, 1925.

A. MULLIGAN

LOCATION INDICATING MEANS FOR MAPS

Filed Sept. 15, 1924

Inventor
ANN MULLIGAN.

By A. B. Bowman
Attorney

Patented June 16, 1925.

1,542,079

UNITED STATES PATENT OFFICE.

ANN MULLIGAN, OF SAN DIEGO, CALIFORNIA.

LOCATION-INDICATING MEANS FOR MAPS.

Application filed September 15, 1924. Serial No. 737,775.

*To all whom it may concern:*

Be it known that I, ANN MULLIGAN, a citizen of the United States, residing at San Diego, in the county of San Diego and State of California, have invented a certain new and useful Location-Indicating Means for Maps, of which the following is a specification.

My invention relates to a location indicating means for maps, and the objects of my invention are: first, to provide a means of this class whereby cities, streets, or other locations of maps printed or otherwise inscribed on opposite sides of a sheet of paper or other material, may be conveniently located with a single indicator shiftably mounted on the sheet; second, to provide a location indicating means for maps, which means is provided with a shiftable indicator adapted to be pivotally mounted at its opposite ends in a central location of the map printed or inscribed on the opposite sides of a sheet and adapted to extend radially from a pivotal portion in the sheet over the portions of the map desired; third, to provide a means of this class which is provided with a flat measuring or indicating tape having reduced pivotal portions near its opposite ends, the pivotal portions being adapted to be mounted one at a time in a pivotal portion in the sheet upon which the maps are printed or inscribed, and the flat measuring or indicating portion being adapted to be pulled through an elongated slot contiguous to the pivotal portion in the sheet for shifting the indicator to the opposite sides of the sheet; fourth, to provide a means of this class having a flat measuring or indicating member adapted to be pulled through a slot and utilized on the opposite sides of a sheet; fifth, to provide a means of this class having a flexible indicator adapted to be pivotally supported at its opposite ends in a pivotal portion in a sheet, and pulled through said pivotal portion in the sheet for utilizing the indicator on the opposite sides of the sheet; sixth, to provide a map structure having maps on its opposite sides and provided with a pivot portion and location indicating characters arranged in circular form about said pivot portion on the opposite sides of the map structure, and also provided with a radial indicator adapted to be used on both sides of the map structure; seventh, to provide as a whole a novelly constructed and arranged location indicating means for maps, and eighth, to provide such a means which is very simple and economical of construction, durable, practical to manipulate, and which will not readily deteriorate or get out of order.

Figure 2:
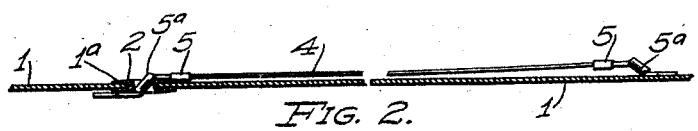
Figure 3:
Figure 4:
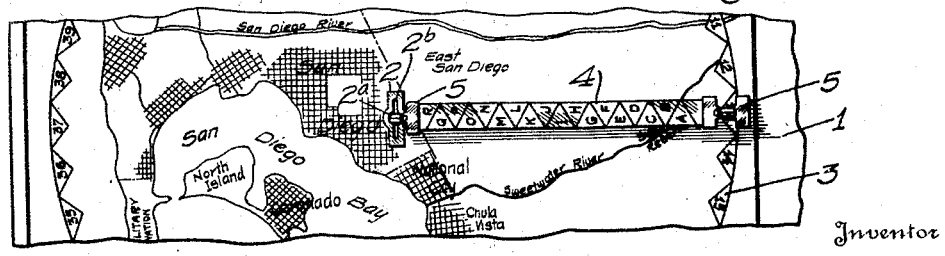

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a plan view of a map with my location indicating means in connection therewith; Fig. 2 is an enlarged fragmentary sectional view thereof, with the section taken through 2—2 of Fig. 1; Fig. 3 is an enlarged perspective view of the pivot means at the end of the shiftable location indicator or tape, and Fig. 4 is a fragmentary view of a map shown on the back side of the map in Fig. 1, with my location indicating means in connection therewith.

Like characters of reference refer to similar parts and portions throughout the several views of the drawings.

The sheet or card 1 of my map structure, upon which the maps are mounted, may be of any suitable material, such as paper, cardboard or cloth. On the opposite sides of the sheet or card 1 are printed, inscribed or otherwise mounted different maps of any description desired, and are positioned in such relation with each other that the same location indicator may be used to find the desired location on either of the maps. At a suitable portion of the sheet or card, preferably at the central location of the map, is provided a perforation $1^a$ which is surrounded at its edges with a reinforcing eyelet 2. This reinforcing eyelet is provided at its middle portion with a circular opening $2^a$, which merges at opposite sides into slots $2^b$. Around the outer portions of the maps on either side of the member 1 are arranged in circular order, with the opening $2^a$ of the eyelet as a center, direction indicating characters 3, which are positioned in triangular outlines with their vertices pointing toward the circular pivot opening $2^a$ of the eyelet 2.

The shiftable radial indicator consists of a tape 4 of flexible construction and a pair of pivotal end members 5 at its opposite ends. The tape 4 may be made of fabric, paper or metal, as desired, and is provided, preferably on one side only, with characters spaced lengthwise thereon to indicate a radial distance from the pivot portion in the eyelet 2. The pivotal end members 5 are offset and provided intermediate their ends at the offset portions with diagonally positioned, cylindrically formed pivot portions 5ª of slightly less diameter than the opening 2ª in the eyelet 2, so that the pivot portions 5ª may readily revolve in a diagonal position in the opening 2ª. The one end 5ᵇ of the pivotal end members 5 is extended laterally so that the radial indicator may not easily slip through the slot in the eyelet. The opposite ends of the members 5 are provided with backwardly bent or socket portions 5ᶜ in which the ends of the tape 4 are clamped. It will be here noted that if a metal tape is used, the members 4 and 5 may be made integrally, thus simplifying the construction.

The index tabulating the name of the location, together with the characters for finding the location on the map on either side of the member 1, may be of any convenient form and attached or detached from the map structure. To find any desired place on the map shown in Fig. 1, the shiftable indicator is rotated about its pivoted end until the same extends in the direction of and over the proper character 3 arranged in circular order about the center of the eyelet, the particular character 3 being designated in connection with the place desired to be found in the index. The other character in the index in connection with the place desired to be located is then found on the tape portion of the shiftable indicator and the desired place on the map located.

To find a place on the map on the opposite side of the member 1, the shiftable indicator is raised and the pivotal end member and the tape 4 are then slipped through the circular and slotted openings in the eyelet 2 until the pivotal portion 5ª of the member 5 at the opposite end of the indicator rests in the circular opening 2ª of the eyelet. The indicator then is positioned on the opposite side of the member 1, but extends in the opposite direction. The method of procedure of finding a place on the map, shown fragmentarily in Fig. 4, is the same as that described in connection with Fig. 1.

It is obvious from this construction, as illustrated in the drawings and disclosed in the foregoing specification, that there is provided a location indicating means for maps, as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a means of the class described, a map structure provided with a perforation, and a flat shiftable indicator provided with graduated characters rotatably mounted about said perforation at its one end and adapted to be shifted through said perforation.

2. In a means of the class described, a map structure provided with a perforation, and a flat shiftable indicator provided with graduated characters rotatably mounted about said perforation at its one end and adapted to be shifted through said perforation in such a manner than the opposite ends of said indicator will serve as a pivot about the perforation in said map structure.

3. In a means of the class described, a map structure having a map on opposite sides and a pivot portion, and a flat shiftable indicator provided with graduated characters and also provided with pivot portions at its opposite ends adapted to be alternately connected with the pivot portion of the map structure.

4. In a means of the class described, a sheet map member provided with a perforation therethrough, an eyelet having a pivot portion at its middle and merging at opposite sides into elongated slots, said eyelet being secured to said sheet map member around the perforation therein, and a location indicating member pivotally mounted at its one end in the pivotal portion of said eyelet.

5. In a means of the class described, a sheet map member provided with a perforation therethrough, an eyelet having a pivot portion at its middle and merging at opposite sides into elongated slots, said eyelet being secured to said sheet map member around the perforation therein, and a shiftable location indicating member provided with pivot portions at its opposite ends adapted to be alternately connected with the pivot portion in said eyelet and adapted to be extended through the slotted portions in said eyelet.

6. In a location indicating means for maps, a sheet member provided with maps at its opposite sides and a perforation extending therethrough, said perforation being substantially circular at its middle portion and merging into slots at its opposite sides, and a shiftable location indicating member pivotally mounted at its one end in the pivot portion of the perforation in said sheet member.

7. In a location indicating means for maps, a sheet member provided with maps at its opposite sides and a perforation extending therethrough, said perforation being substantially circular at its middle portion and merging into slots at its opposite sides, and a shiftable location indicating member provided with reduced pivot portions at its opposite ends adapted to be alternately positioned in the pivot portions of said perforation.

8. In a location indicating means for maps, a sheet member provided with maps at its opposite sides and a perforation extending therethrough, said perforation being substantially circular at its middle portion and merging into slots at its opposite sides, and a shiftable location indicating member consisting of a flexible tape having characters inscribed on one side and pivotal end members secured to the ends of said flexible tape, said pivotal end members being adapted to be alternately mounted in the pivot portion of said perforation.

9. In a location indicating means for maps, a sheet member provided with maps at its opposite sides and a perforation extending therethrough, said perforation being substantially circular at its middle portion and merging into slots at its opposite sides, and a shiftable location indicating member consisting of a flexible tape having characters inscribed on one side and pivotal end members secured to the ends of said flexible tape, said pivotal end members being offset and provided with inclined cylindrical portions intermediate their ends adapted to extend angularly through the pivot portion of said perforation.

10. In a means of the class described, a sheet map member provided with a map on opposite sides and a perforation therethrough, and a flat location indicating member provided with graduated characters pivotally mounted on said sheet map member through said perforation and adapted to extend from said perforation on the opposite sides of said sheet map member.

11. In a means of the class described, a sheet map member provided with maps on its opposite sides and a perforation therethrough, said sheet map member being provided around the outer portions of the map thereon with circularly arranged characters arranged concentric with said perforation, and a radial location indicating member pivotally mounted on said sheet map member at said perforation and adapted to extend radially from said perforation on the opposite sides of said sheet map member towards said circularly arranged characters.

In testimony whereof, I have hereunto set my hand at San Diego, California, this 5th day of September, 1924.

ANN MULLIGAN.